United States Patent
Thivin et al.

(10) Patent No.: US 10,178,359 B2
(45) Date of Patent: Jan. 8, 2019

(54) MACROPIXEL PROCESSING SYSTEM, METHOD AND ARTICLE

(71) Applicant: STMicroelectronics (Grenoble 2) SAS, Grenoble (FR)

(72) Inventors: Mathieu Thivin, Voreppe (FR); Grégory Roffet, Coublevie (FR)

(73) Assignee: STMICROELECTRONICS (GRENOBLE 2) SAS, Grenoble (FR)

(*) Notice: Subject to any disclaimer, the term of this patent is extended or adjusted under 35 U.S.C. 154(b) by 152 days.

(21) Appl. No.: 15/088,934

(22) Filed: Apr. 1, 2016

(65) Prior Publication Data

US 2017/0287149 A1    Oct. 5, 2017

(51) Int. Cl.
  *G06K 9/00*    (2006.01)
  *H04N 9/04*    (2006.01)
  *H04N 9/67*    (2006.01)

(52) U.S. Cl.
  CPC ............... *H04N 9/04* (2013.01); *H04N 9/67* (2013.01); *H04N 9/045* (2013.01)

(58) Field of Classification Search
  CPC ......... G06F 17/30905; G06F 17/30749; G06F 17/30761; G06F 17/30522; G06F 17/3053; G06F 17/30554; G06F 17/303643; G06F 17/30035; G06F 17/3025; G06F 17/30277; G06F 17/30244; G06F 17/30259; G06F 17/30256; G06F 17/30663; G06F 17/30687; G06F 17/30864; G06F 17/30017

See application file for complete search history.

(56) References Cited

U.S. PATENT DOCUMENTS

| | | |
|---|---|---|
| 7,002,627 B1 | 2/2006 | Raffy et al. |
| 8,079,525 B1 | 12/2011 | Zolotov |
| 8,508,624 B1 | 8/2013 | Linzer |
| 2006/0232808 A1 | 10/2006 | Lyons et al. |
| 2006/0285135 A1 | 12/2006 | Mestha et al. |
| 2008/0075394 A1* | 3/2008 | Huang ............. G06T 3/4015 382/300 |
| 2009/0317017 A1* | 12/2009 | Au ................. G06T 5/008 382/274 |
| 2011/0063480 A1 | 3/2011 | Kim |
| 2011/0182510 A1 | 7/2011 | Hong |
| 2012/0293677 A1 | 11/2012 | Ostrovsky |
| 2013/0064448 A1 | 3/2013 | Tomaselli et al. |
| 2014/0037207 A1 | 2/2014 | Chen |
| 2014/0133749 A1 | 5/2014 | Kuo et al. |
| 2016/0086309 A1 | 3/2016 | Hsu et al. |

* cited by examiner

*Primary Examiner* — Duy M Dang
(74) *Attorney, Agent, or Firm* — Seed IP Law Group LLP

(57) ABSTRACT

Tone mapping is performed by digital image processing circuitry on a macro-pixel basis. A luminance value of a macro-pixel of a digital image in a color space is determined. The macro-pixel includes a plurality of individual pixels. Respective tone-mapping gain values of each pixel of the macro-pixel are determined based on the determined luminance value of the macro-pixel. The determined tone-mapping gains are applied to the respective pixels of the macro-pixel. The color space may be a CFA color space, such as a Bayer color space.

24 Claims, 12 Drawing Sheets
(3 of 12 Drawing Sheet(s) Filed in Color)

| Clock Cycle (1st line) | 0 | 1 | 2 | 3 | ... | x |
|---|---|---|---|---|---|---|
| Raster | GiR(0,0) | R(0,0) | GiR(0,1) | R(0,1) | ... | R(0,floor(x/2)) |
| MacroPixel | GiR(0,0) R(0,0) B(0,0) GiB(0,0) | GiR(0,1) R(0,1) B(0,1) GiB(0,1) | GiR(0,2) R(0,2) B(0,2) GiB(0,2) | GiR(0,3) R(0,3) B(0,3) GiB(0,3) | ... | GiR(0,x) R(0,x) B(0,x) GiB(0,x) |
| Clock Cycle (2nd line) | 0 | 1 | 2 | 3 | ... | x |
| Raster | B(0,0) | GiB(0,0) | B(0,1) | GiB(0,1) | ... | GiB(0,floor(x/2)) |
| MacroPixel | GiR(1,0) R(1,0) B(1,0) GiB(1,0) | GiR(1,1) R(1,1) B(1,1) GiB(1,1) | GiR(1,2) R(1,2) B(1,2) GiB(1,2) | GiR(1,3) R(1,3) B(1,3) GiB(1,3) | ... | GiR(1,x) R(1,x) B(1,x) GiB(1,x) |

| Clock Cycle (1st line) | 0 | 1 | 2 | 3 | ... | x |
|---|---|---|---|---|---|---|
| Raster | GiR(0,0) | R(0,0) | GiR(0,1) | R(0,1) | ... | R(0,floor(x/2)) |
| MacroPixel | GiR(0,0)<br>R(0,0)<br>B(0,0)<br>GiB(0,0) | GiR(0,1)<br>R(0,1)<br>B(0,1)<br>GiB(0,1) | GiR(0,2)<br>R(0,2)<br>B(0,2)<br>GiB(0,2) | GiR(0,3)<br>R(0,3)<br>B(0,3)<br>GiB(0,3) | ... | GiR(0,x)<br>R(0,x)<br>B(0,x)<br>GiB(0,x) |
| Clock Cycle (2nd line) | 0 | 1 | 2 | 3 | ... | x |
| Raster | B(0,0) | GiB(0,0) | B(0,1) | GiB(0,1) | ... | GiB(0,floor(x/2)) |
| MacroPixel | GiR(1,0)<br>R(1,0)<br>B(1,0)<br>GiB(1,0) | GiR(1,1)<br>R(1,1)<br>B(1,1)<br>GiB(1,1) | GiR(1,2)<br>R(1,2)<br>B(1,2)<br>GiB(1,2) | GiR(1,3)<br>R(1,3)<br>B(1,3)<br>GiB(1,3) | ... | GiR(1,x)<br>R(1,x)<br>B(1,x)<br>GiB(1,x) |

*FIG. 4B*

MACROPIXEL PROCESSING SYSTEM, METHOD AND ARTICLE

BACKGROUND

Technical Field

The description relates to systems, methods and articles to process images, e.g., to convert RGB images to YUV images.

Description of the Related Art

There are various color models that can be used to represent the pixel information of a color image. The RGB (red, green, blue) color model consists of three values R, G and B for each pixel representing respectively an intensity of red, green and blue. Such a representation corresponds closely to the display of images on displays such as cathode ray tubes (CRT) and liquid crystal displays (LCDs). For storage, processing and transmission purposes, the RGB format may not be optimum, and thus RGB image data may be converted into different color models, such as the YUV color model or variants thereof, according to which one value Y represents luminance information of the pixel, and two values UV represent the chrominance information. The YUV images may be transmitted, encoded or compressed, for example, using JPEG/H264 encoding.

In addition, many devices, such as mobile devices, include one or more image sensors or cameras capable of capturing digital images, for example, in various formats such as RGB and YUV formats, as well as displays for displaying images in various formats, such as RGB and YUV formats. An image sensor may comprise an array of pixel sensors arranged in a grid pattern defined as the color filter array (CFA). This color filter array may be composed of different color patterns and for example R, G, G, B Bayer pattern. Such devices typically include digital image processing circuitry, which may, for example, convert CFA images to RGB images and then to YUV images, process the images for storage, display, image quality, transmission or other purposes, etc.

BRIEF SUMMARY

In an embodiment, a method comprises: determining, using digital image processing circuitry, a luminance value of a macro-pixel of a digital image in a color space, the macro-pixel including a plurality of individual pixels; determining, using the digital image processing circuitry, respective gain values of each pixel of the macro-pixel based on the determined luminance value of the macro-pixel; and applying, using the digital image processing circuitry, the determined gain values to the respective pixels of the macro-pixel. In an embodiment, the method comprises: maintaining, using the digital image processing circuitry, a look-up table; and determining the respective gain values of the pixels of the macro-pixel based on the luminance value of the macro-pixel and the look-up table. In an embodiment, the method comprises: maintaining, using the digital image processing circuitry, luminance based histogram information; and maintaining, using the digital image processing circuitry, the look-up table based on the luminance based histogram information. In an embodiment, the method comprises: processing a plurality of macro-pixels of the digital image, wherein the maintaining the luminance based histogram information comprises generating a histogram based on half of the macro-pixels of the plurality of macro-pixels. In an embodiment, the determining the respective gain values of the pixels of the macro-pixel based on the luminance value of the macro-pixel and the look-up table comprises performing a single look-up operation in the look-up table. In an embodiment, each pixel of the macro-pixel has a single respective gain value. In an embodiment, the color space is a Bayer color space.

In an embodiment, a device comprises: luminance determination circuitry, which, in operation, determines a luminance value of a macro-pixel of a digital image in a color space, the macro-pixel including a plurality of individual pixels; gain determination circuitry, which in operation, determines respective gain values of each pixel of the macro-pixel based on the determined luminance value of the macro-pixel; and gain application circuitry, which, in operation, applies the determined gain values to the respective pixels of the macro-pixel. In an embodiment, the gain determining circuitry comprises a look-up table and, in operation, the gain determining circuitry determines the respective gain values of the pixels of the macro-pixel based on the luminance value of the macro-pixel and the look-up table. In an embodiment, the device comprises: histogram generation circuitry, which, in operation, generates a histogram based on macro-pixel luminance historical information, wherein the gain determination circuitry, in operation, determines respective gain values of each pixel of the macro-pixel based on the determined luminance value of the macro-pixel and the histogram. In an embodiment, the histogram generation circuitry, in operation, generates the histogram based on half of a plurality of macro-pixels of the digital image. In an embodiment, the determining the respective gain values of the pixels of the macro-pixel based on the luminance value of the macro-pixel and the look-up table comprises performing a single look-up operation in the look-up table. In an embodiment, each pixel of the macro-pixel has a single respective gain value. In an embodiment, the color space is a color filter array (CFA) color space. In an embodiment, the CFA color space is a Bayer color space.

In an embodiment, a system comprises: an image sensor, which, in operation, generates digital images in a color space; and digital image tone mapping circuitry, which, in operation: determines a luminance value of a macro-pixel of a digital image in the color space, the macro-pixel including a plurality of individual pixels; determines respective gain values of each pixel of the macro-pixel based on the determined luminance value of the macro-pixel; and applies the determined gain values to the respective pixels of the macro-pixel. In an embodiment, the digital image tone mapping circuitry comprises a look-up table and, in operation, the digital image tone mapping circuitry determines the respective gain values of the pixels of the macro-pixel based on the luminance value of the macro-pixel and the look-up table. In an embodiment, the digital image tone mapping circuitry, in operation, generates a histogram based on macro-pixel luminance historical information and determines respective gain values of each pixel of the macro-pixel based on the determined luminance value of the macro-pixel and the histogram. In an embodiment, the histogram is based on half of a plurality of macro-pixels of the digital image. In an embodiment, the digital image tone mapping circuitry comprises a plurality of multipliers, which, in operation, multiple respective pixels of the macro-pixel by the respective gain values. In an embodiment, the color space is a Bayer color space.

In an embodiment, a non-transitory computer-readable medium has contents which configure a digital image processing circuit to perform a tone mapping method, the tone mapping method comprising: determining a luminance value of a macro-pixel of a digital image in a color space, the macro-pixel including a plurality of individual pixels; determining respective gain values of each pixel of the macro-pixel based on the determined luminance value of the macro-pixel; and applying the determined gain values to the respective pixels of the macro-pixel. In an embodiment, the method comprises: maintaining a look-up table; and determining the respective gain values of the pixels of the macro-pixel based on the luminance value of the macro-pixel and the look-up table. In an embodiment, the method comprises: maintaining historical luminance information; and maintaining the look-up table based on the historical luminance information. In an embodiment, the color space is a color-filter-array (CFA) color space.

In an embodiment, a system comprises: means for sensing images, and digital image tone mapping means, which: determines a luminance value of a macro-pixel of a digital image in the color space, the macro-pixel including a plurality of individual pixels; determines respective gain values of each pixel of the macro-pixel based on the determined luminance value of the macro-pixel; and applies the determined gain values to the respective pixels of the macro-pixel. In an embodiment, the digital image tone mapping means comprises a look-up table and determines the respective gain values of the pixels of the macro-pixel based on the luminance value of the macro-pixel and the look-up table. In an embodiment, the digital image tone mapping means generates a histogram based on macro-pixel luminance historical information and determines respective gain values of each pixel of the macro-pixel based on the determined luminance value of the macro-pixel and the histogram. In an embodiment, the histogram is based on half of a plurality of macro-pixels of the digital image. In an embodiment, the digital image tone mapping means comprises a plurality of multipliers, which, multiple respective pixels of the macro-pixel by the respective gain values. In an embodiment, the color space is a Bayer color space.

BRIEF DESCRIPTION OF THE DRAWINGS

The patent or application file contains at least one drawing executed in color. Copies of this patent or patent application with color drawing(s) will be provided by the Office upon request and payment of the necessary fee.

FIG. 4B is a graphical illustration comparing raster processing to macro-pixel processing.

DETAILED DESCRIPTION

Figure 1:
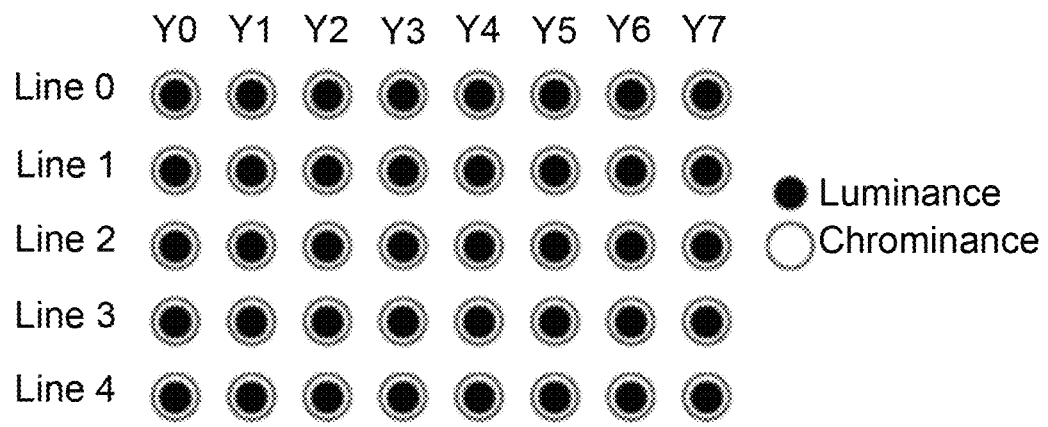
FIG. 1 illustrates YUV spatial sampling of an image according to a YUV 4:4:4 format.

In the following description, certain details are set forth in order to provide a thorough understanding of various embodiments of devices, systems, methods and articles. However, one of skill in the art will understand that other embodiments may be practiced without these details. In other instances, well-known structures and methods associated with, for example, image sensors, displays, digital image processing circuitry, etc., such as transistors, integrated circuits, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to."

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure.

The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not necessarily intended to convey any information regarding the actual shape of particular elements, and have been selected solely for ease of recognition in the drawings.

FIG. 1 illustrates an example YUV spatial sampling of an image in a YUV 4:4:4 format, which may be generated, for example, from a representation of the image in an RGB data format. Each pixel of the YUV 4:4:4 representation has three components, a Luminance value Y representing the luminance component of the pixel, and Chrominance values U, V representing the chrominance components of the pixel.

Figure 2:
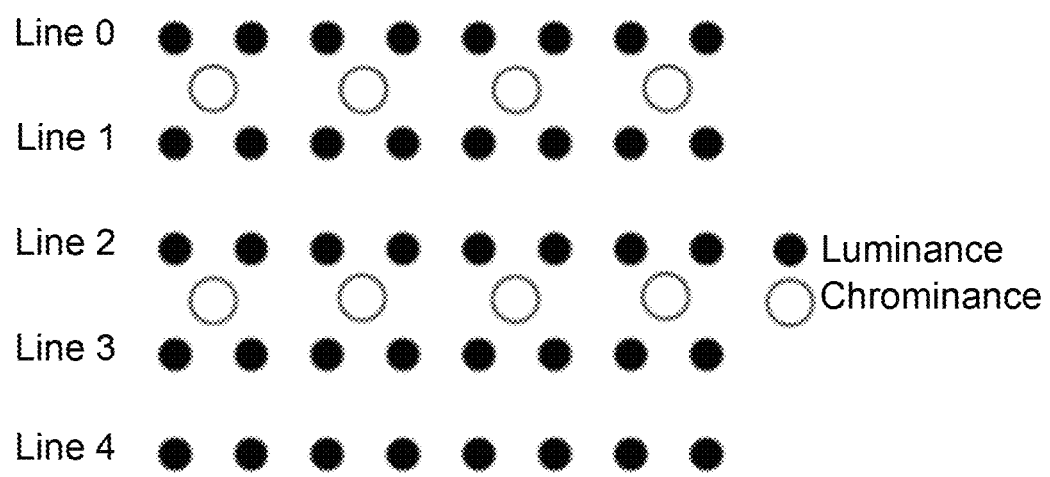
FIG. 2 illustrates YUV spatial sampling of an image according to a YUV 4:2:0 format.

FIG. 2 illustrates an example YUV spatial sampling of an image in a YUV 4:2:0 format, which may be generated, for example, from a representation of the image in an RGB data format or in a YUV 4:4:4 format. Other YUV 4:2:0 formats may be used. Each pixel of the YUV 4:2:0 representation has three components, a Luminance value Y representing the luminance component of the pixel, and Chrominance values U, V representing the chrominance components of the pixel. However, blocks of 4 pixels share the same chrominance components U, V. Images may be converted to YUV 4:2:0 to reduce the amount of data needed to store the image. For example, U and V values may be shared for horizontally and vertically adjacent pixels. YUV format 4:2:0 is typically used in JPEG images and digital video disks and Blue-Ray™ videos. Images are typically raster-processed in RGB, Bayer or YUV 4:4:4 format until just prior to encoding, or just before or after transmission. In conventional raster-based processing, YUV 4:2:0 format is supported by duplicating chrominance components (which are the same for horizontally adjacent pixels as shown in FIG. 2).

Figure 3:
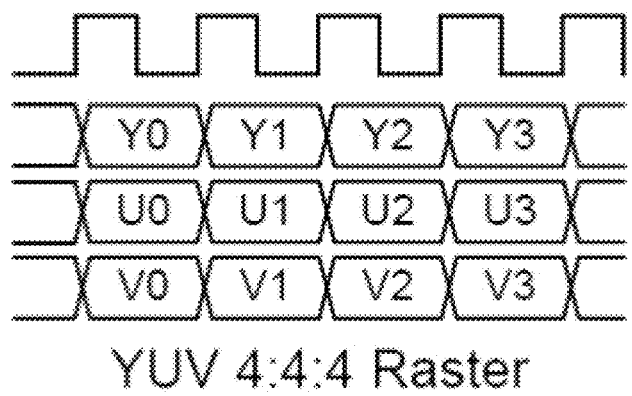
FIG. 3 is a timing diagram for processing pixels of an image in a YUV 4:4:4 format.

FIG. 3 is a timing diagram for processing pixels of an image in a YUV 4:4:4 format in raster processing. Raster processing processes one pixel per clock cycle from the top left to the bottom right line per line. With reference to FIG. 1, at a first clock pulse the first pixel of the first row is read in, at a second clock pulse the second pixel of the first row is read in, and so forth until the last pixel of the last row is processed. The digital image processing circuitry must have a bus width and processing configuration to support three components for each pixel to have all the components available for processing.

Figure 4A:
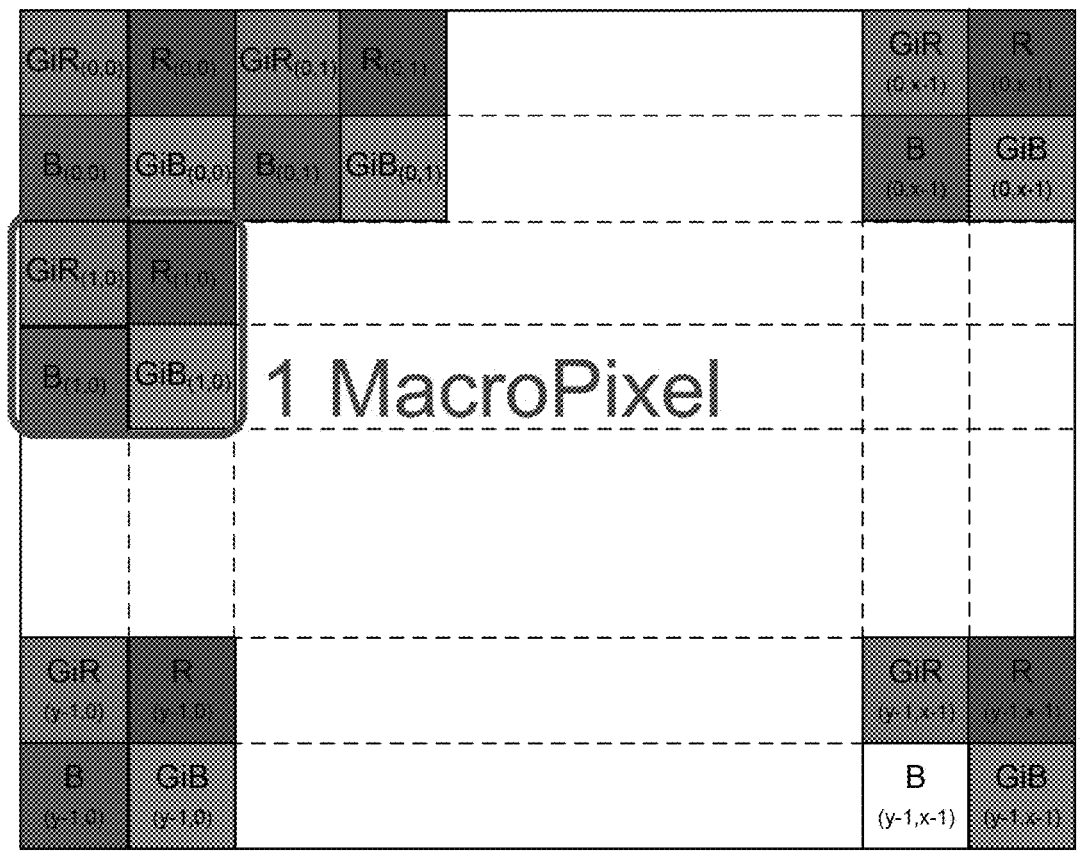
FIG. 4A illustrates a Bayer RGB format macro-pixel according to an embodiment.
Figure 5:
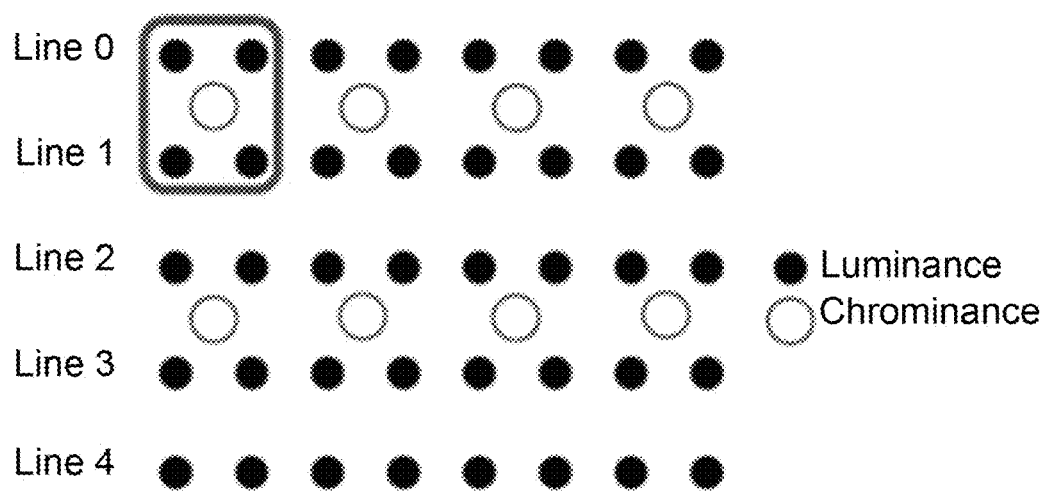
FIG. 5 illustrates a YUV 4:2:0 format macro-pixel according to an embodiment.

In an embodiment, macro-pixels are processed instead of individual pixels. FIG. 4A illustrates a macro-pixel of Bayer CFA format according to an embodiment. FIG. 4B graphically compares pixel-per-clock cycle processing to macro-pixel-per-clock cycle processing. Four pixels of a two-by-two pattern may be read in and/or processed and output as a macro-pixel per clock cycle (e.g., with reference to FIG. 4A, pixels GiR(0,0), R(0,0), B(0,0) and GiB(0,0) may be processed in a first clock cycle, pixels GiR(0,1), R(0,1), B(0,1) and GiB(0,1) may be processed in a second clock cycle, etc.) Top-left to bottom right processing of the macro-pixels may be employed. FIG. 5 illustrates a macro-pixel of a YUV 4:2:0 format according to an embodiment. Each YUV 4:2:0 format macro-pixel has six components, four luminance Y values and two chrominance values U and V. When using macro-pixel processing, the frequency may be reduced in an embodiment by a factor of four as compared to raster-based processing.

Figure 6:
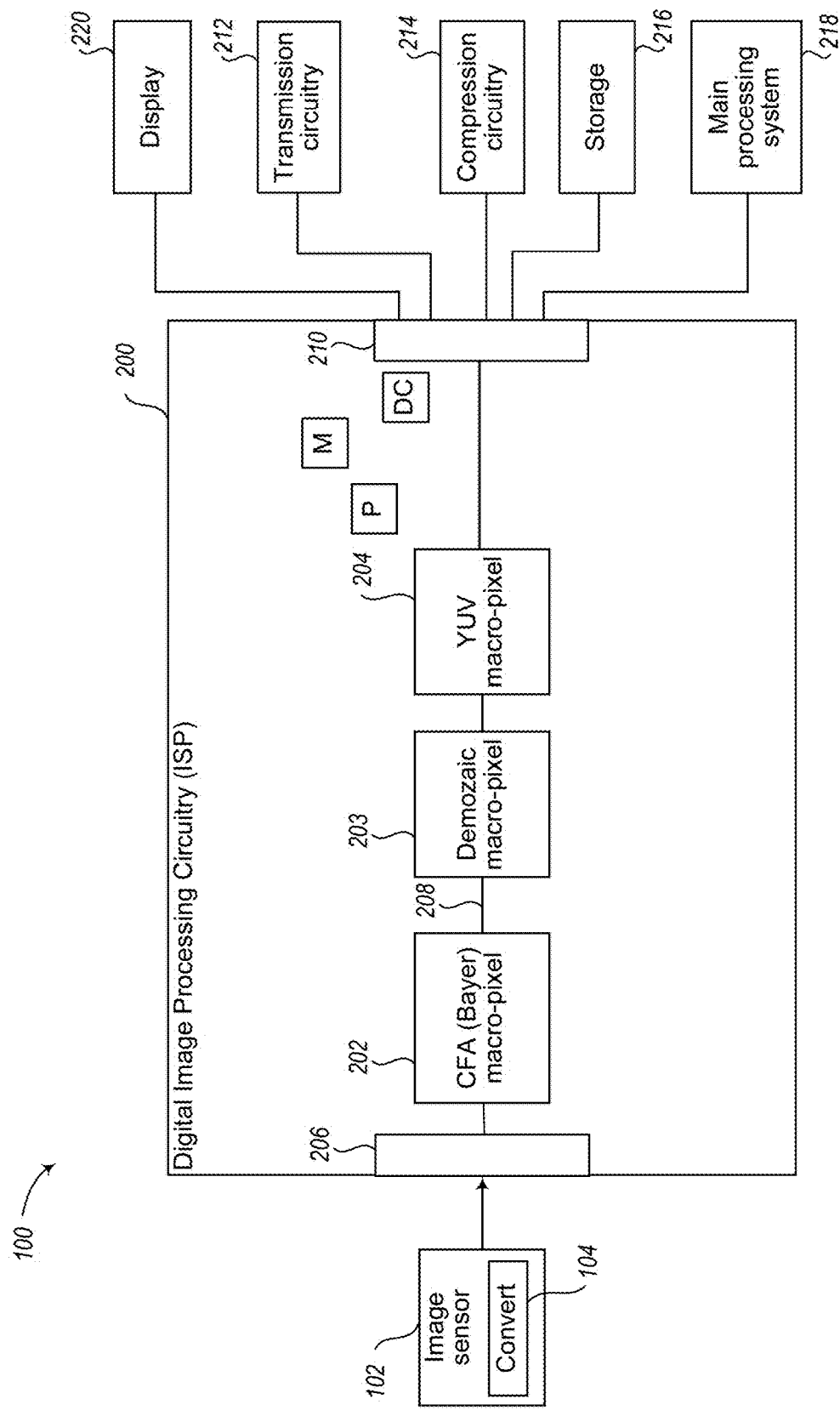
FIG. 6 is a functional block diagram of an embodiment of a system which, in operation, process macro-pixels.

FIG. 6 illustrates an embodiment of a system 100 to process macro-pixels of an image. As illustrated, the system 100 comprises one or more image sensors 102, macro-pixel digital image processing circuitry 200 and other processing circuitry, as illustrated a display 220, transmission circuitry 212, compression circuitry 214, storage 216 and a main processing system 218.

The image sensor 102 may comprise an array of pixels each including a photodetector and an amplifier. The image sensor may be configured to output data (for example, in Bayer format) to be read on a macro-pixel by macro-pixel basis (e.g., with a sufficient number of output data lines, to output serial data having a sufficient number of bits or words per clock cycle, etc.) or on a pixel-by-pixel basis which may then be converted into macro-pixels, for example by an optional buffering and conversion circuit 104.

The macro-pixel digital image processing circuitry ISP 200 comprises an CFA processing stage or circuitry 202, which in operation processes CFA macro-pixels such as Bayer macro-pixels, a demozaic processing stage or circuit 203, which, in operation, performs demozaic operations on macro-pixels, and a YUV processing stage or circuitry 204, which, in operation, processes YUV macro-pixels such as YUV 4:2:0 macro-pixels. It is noted that embodiments of the CFA circuitry 202 may locally perform some processing in other formats, such as YUV formats, and embodiments of the YUV circuitry 204 may perform some processing in other formats, such as RGB formats. It is also noted that embodiments of the CFA circuitry 202 and of the YUV circuitry 204 may perform some processing as raster-based processing. In some embodiments, macro-pixel processing may comprise using parallel processing to process multiple individual pixels of a macro-pixel in a clock cycle, using a faster clock for some sub-processes, etc. For example, in some embodiments raster-based tone mapping may be employed using parallel processing and buffers to process multiple individual pixels in a clock cycle.

The ISP circuitry 200 also comprises an interface 206 to receive macro-pixels to process (such as from the image sensor 102). As noted above, a buffering and conversion subsystem 104 may be employed to convert pixels read from the image sensor on a pixel-by-pixel basis into macro-pixels, and may be incorporated into the image sensor 102 as shown, into the ISP circuitry 200, or may be implemented as a separate circuit to couple the image sensor 102 to the ISP circuitry 200.

The ISP circuitry 200 comprises a bus system 208 to couple the various components of the ISP circuitry 200 together, and an interface 210 to couple the ISP circuitry 200 to other system components, which as illustrated include transmission circuitry 212, compression circuitry 214, storage 216, a main processing system 218 and a display 220. The bus system 208 may be configured to transport image data in the form of CFA macro-pixels within the CFA processing stage or circuitry 202 and to transport image data in the form of YUV macro-pixels within the YUV processing stage or circuitry 204 (e.g., as YUV 4:4:4 macro-pixels or YUV 4:2:0 macro-pixels). The ISP circuitry 200 as illustrated includes one or more processors P, one or more memories M and discrete circuitry DC. The various components of the system 100 may be used alone or in various combinations to perform the various functions of the system 100. For example, the processor P, the one or more memories M and the discrete circuitry DC may be used alone or in various combinations to perform the functions of the CFA circuitry 202, the demozaic circuitry 203, the YUV circuitry 204, etc. Although the components of the system 100 are described as separate components for ease of illustration, the components may be combined or separated into additional components in various manners. For example, the compression circuitry 214 may be integrated into the ISP circuitry 200 in some embodiments, Bayer to YUV conversion circuitry may be incorporated into the RGB macro-pixel processing circuitry 202 in some embodiments, may be incorporated into the YUV macro-pixel processing circuitry 204 in some embodiments.

Figure 7:
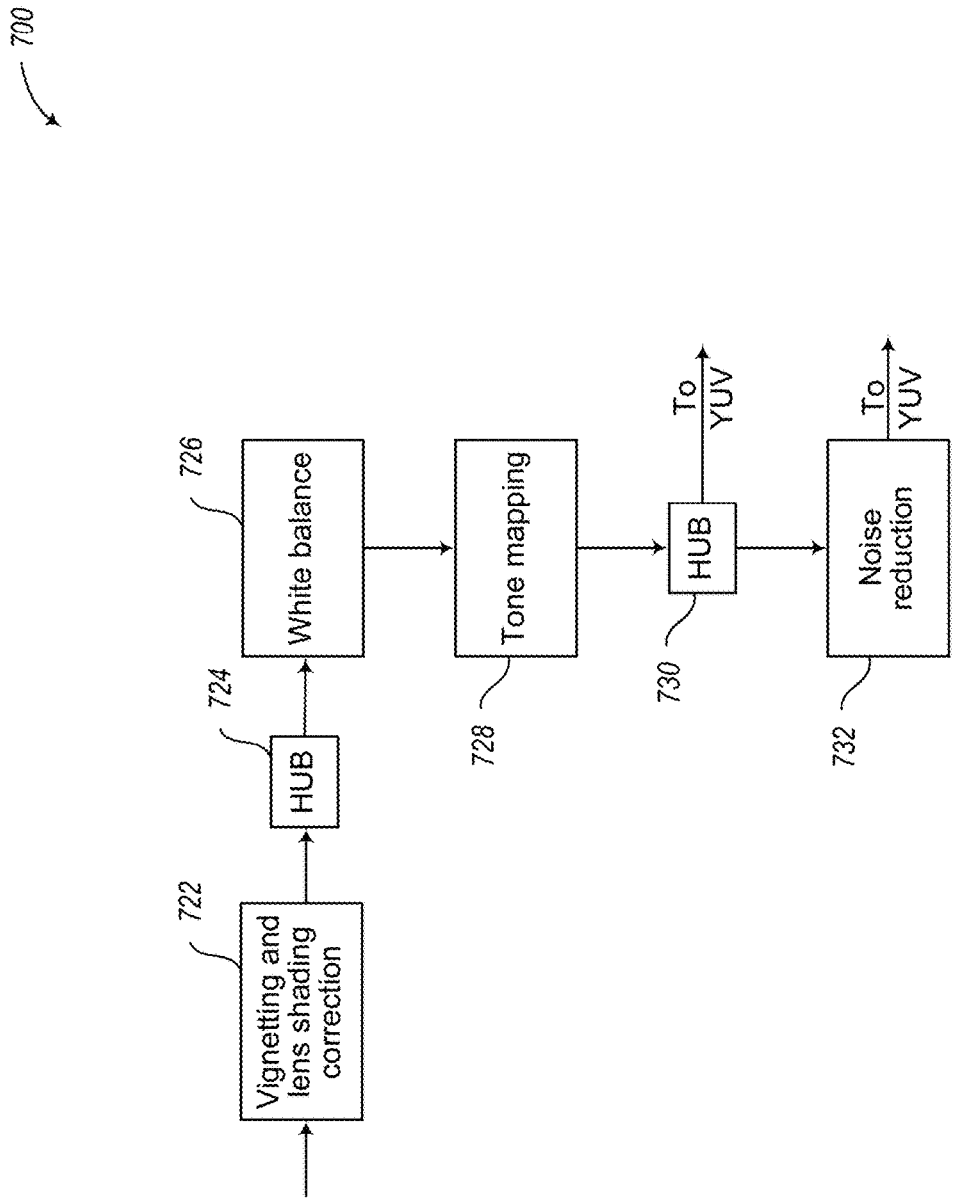
FIG. 7 is a functional block diagram of an embodiment of a CFA macro-pixel processing circuit.

FIG. 7 is a functional block diagram of a Bayer macro-block processing circuit 700 according to an embodiment. The Bayer macro-block processing circuit 700 may be employed, for example, in the system 100 of FIG. 6 as the CFA processing circuitry 202. As illustrated, the Bayer circuit 700 receives a macro-pixel for processing at a vignetting and lens shading correction circuit 722. The vignetting and lens shading circuit 722 determines a gain to apply to each pixel to compensate for quality issues arising due to the position of a pixel in an array. For example, edge pixels may have a lower intensity than centrally located pixels because of the imperfection of the optical elements. In an embodiment, the lens shading circuit 722 applies grid-based color shading correction during macro-pixel processing.

Figure 8:
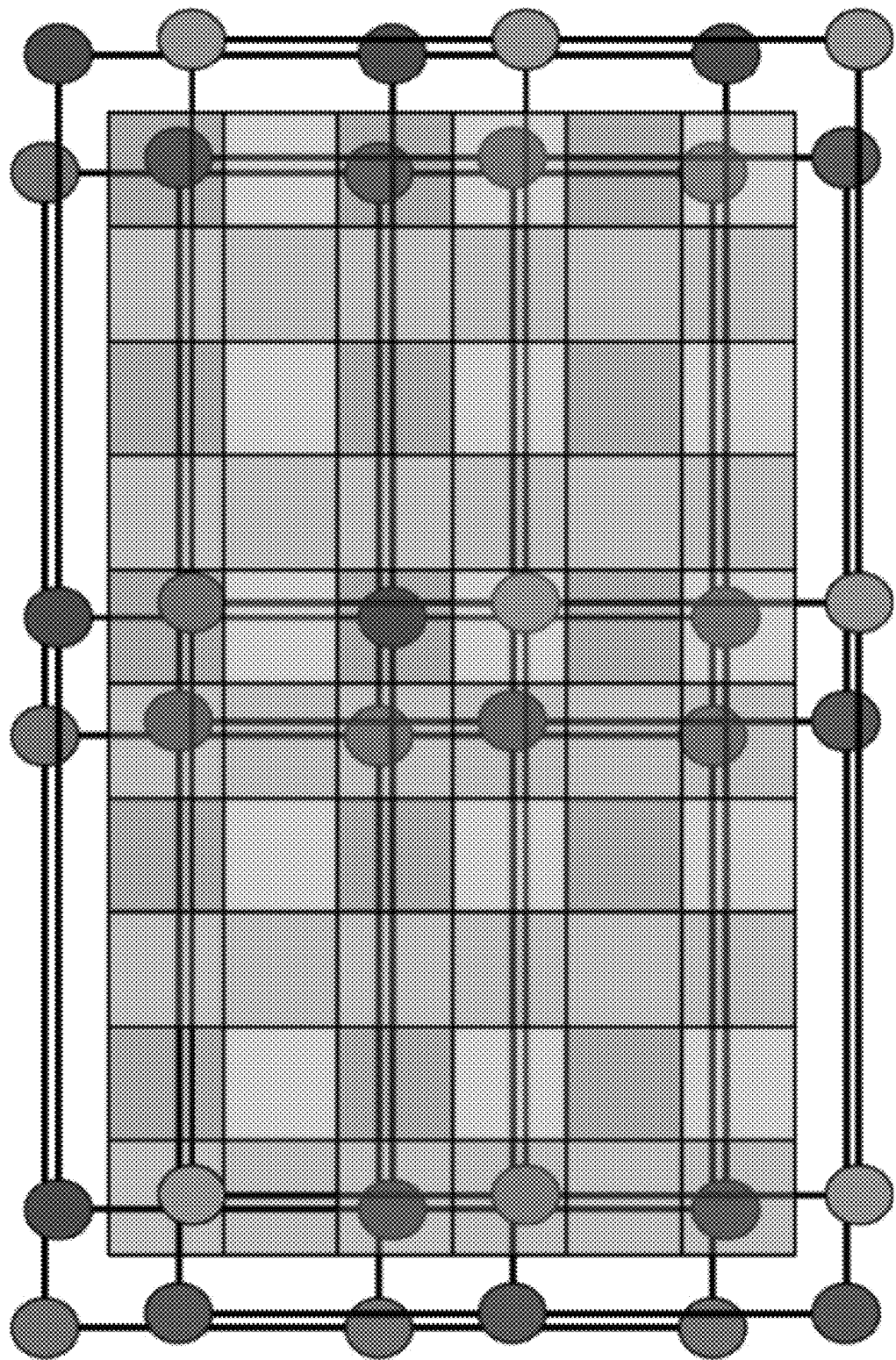
FIG. 8 is a graphical representation of overlaying an RGB image representation with a set of grids.

FIG. 8 is a graphical representation of a set of four grids overlaying an RGB representation of an image. One grid or channel is defined for each color of the macro-pixels (e.g., a grid for Green in red pixels, a grid for Red pixels, a grid for Blue pixels, and a grid for Green in blue pixels).

Figure 9:
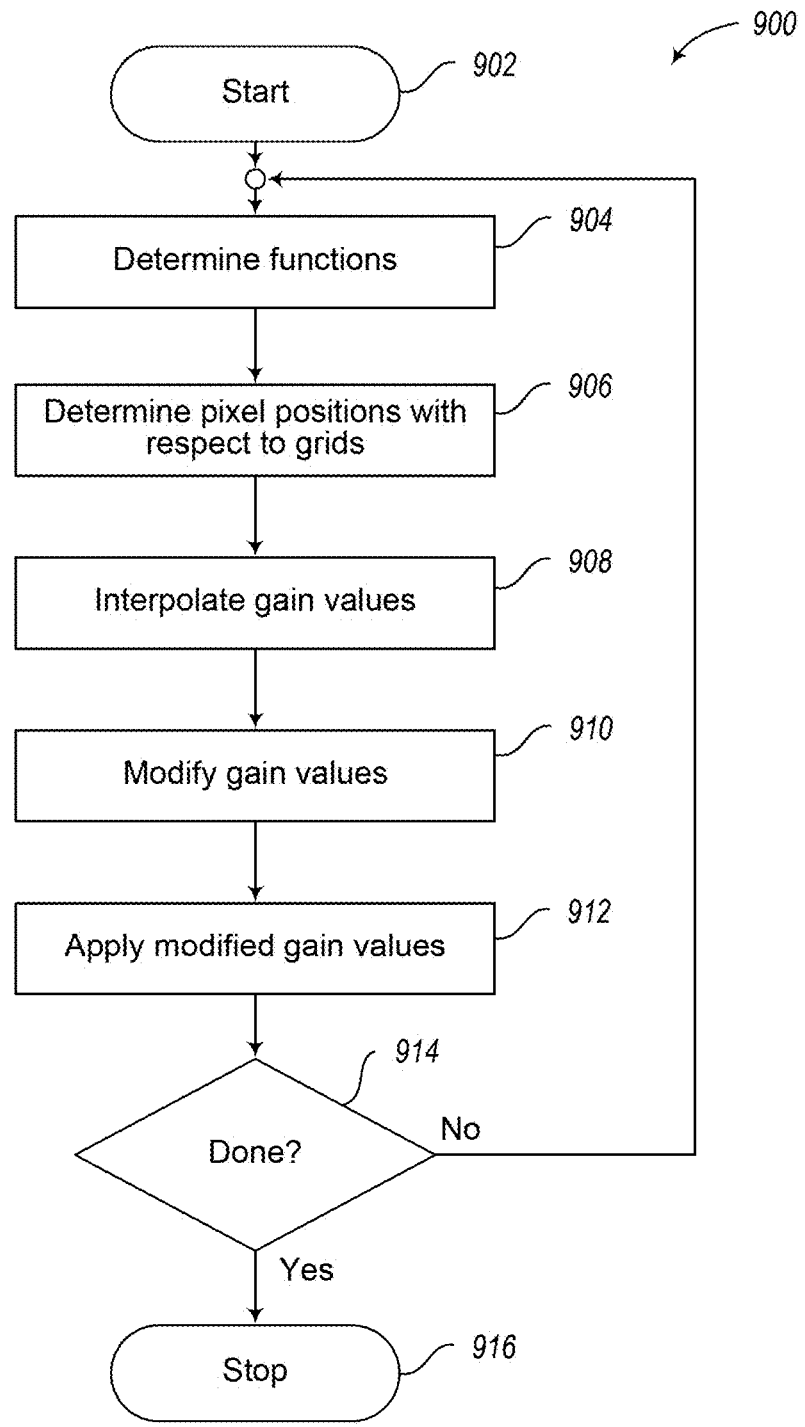
FIG. 9 illustrates an embodiment of a method of applying grid-based color shading correction during macro-pixel processing.

FIG. 9 illustrates an embodiment of a method 900 of applying grid-based color shading correction during processing of a macro-pixel, which may be employed, for example, by the lens shading circuit 722 of FIG. 7. For convenience, the method 900 will be described with reference to the lens shading circuit 722 of FIG. 7. The method 900 starts at 902 and proceeds to 904. At 904, the lens shading circuitry 722 determines a function f(x,y) for each pixel of the macro-pixel based on a location of a pixel within a pixel array. For example, the following formula may be used to determine the function f(x,y) of a pixel:

$$f(x,y)=1-C \times R(x,y)^2 \qquad \text{(Equation 1)}$$

where C is an adjustable parameter (e.g., selectable using software; determined based on characteristics of the image or history data, etc.), x and y are coordinates of the pixel from a center of the pixel array (or image), and:

$$R(x,y)=x^2+y^2 \qquad \text{(Equation 2)}.$$

The method 900 proceeds to 906. At 906 the lens shading circuitry 722 determines a relative position of each pixel with respect to the corresponding grid (e.g., with respect to the Green in red grid for a Green in red pixel). The method 900 proceeds to 908. At 908, the lens shading circuitry 722 interpolates a gain value for each pixel based on a pixel location within the respective grid. The method 900 proceeds to 910. At 910, the lens shading circuitry 722 modifies the interpolated gain value for each pixel based on the respective determined function f(x,y) of the pixel. The method 900 proceeds to 912. At 912, the lens shading circuitry 722 applies the modified gain values to the respective pixels of the macro-pixel. The method 900 proceeds to 914. At 914, the lens shading circuitry 722 determines whether there are additional macro-pixels to process. When it is determined that there are additional macro-pixels to process, the method 900 returns to 904 to process the next macro-pixel. When it is not determined that there are additional macro-pixels to process, the method 900 proceeds to 916, where the method 900 stops.

It is estimated that using macro-pixel based processing to perform grid-based color shading in an embodiment of FIG. 9 may use 190% more area and 6.25% less power consumption than using raster processing.

Applicant has realized, however, that further improvement is possible when processing at a macro-pixel level is employed as opposed to conventional raster-based processing. Processing macro-pixels instead of individual pixels facilitates reducing the number of multiplications used to determine the function f(x,y) of the pixels at act 904. Because $(x+1)^2 = x^2+2x+1$ (and $(y+1)^2 = y^2+2y+1$), determining the function f(x,y) of each pixel may be simplified when macro-pixel processing is employed. In pixel-by-pixel based processing, determining the function f(x,y) involves 2 multiplications per pixel ($x^2$ and $y^2$ are be determined for each pixel), and eight multiplications per macro-pixel. In macro-pixel processing, $x^2$ and $y^2$ may be determined once for a first pixel of the macro-pixel, and then reused to determine the functions f(x,y) of the other pixels of the macro-pixel. When the $x^2$ and $y^2$ values of the first pixel are reused, only two multiplications are needed to determine the function f(x,y) of the first pixel of a macro-pixel, and addition may be used to determine the functions f(x,y) of the remaining pixels of the macro-pixel. For example:

$$R(x,y)=x^2+y^2 \qquad \text{First Pixel}$$

$$R(x+1,y)=x^2+2x+1+y^2 \qquad \text{Second Pixel}$$

$$R(x,y+1)=x^2+y^2+2y+1 \qquad \text{Third Pixel}$$

$$R(x+1,y+1)=x^2+y^2+2x+2y+2 \qquad \text{Fourth Pixel}$$

Processing macro-pixels instead of individual pixels also facilitates reducing the computations needed to determine the relative positions of the individual pixels of the macro-pixel with respect to the respective grids at act 906. The grid positions are fixed with respect to each other and the pixel positions of pixels of a macro-pixel are fixed with respect to each other. Once the relative position of one of the pixels of a macro-pixel to the respective grid is determined, the relative position of the other pixels of the macro-pixel to the respective grids may be determined based on the determined relative position of the one of the pixels. In some embodiments, the relative position of a Green in red pixel of a macro-pixel to the Green in red grid is the same as the relative position of the other pixels of the macro-pixel to the respective grids. In pixel-by-pixel processing, the relative distance of each pixel to the respective grid needs to be determined for each pixel, and four calculations are used for each macro-pixel. In macro-pixel processing, the relative distance may be determined once for each macro-pixel.

Figure 10:
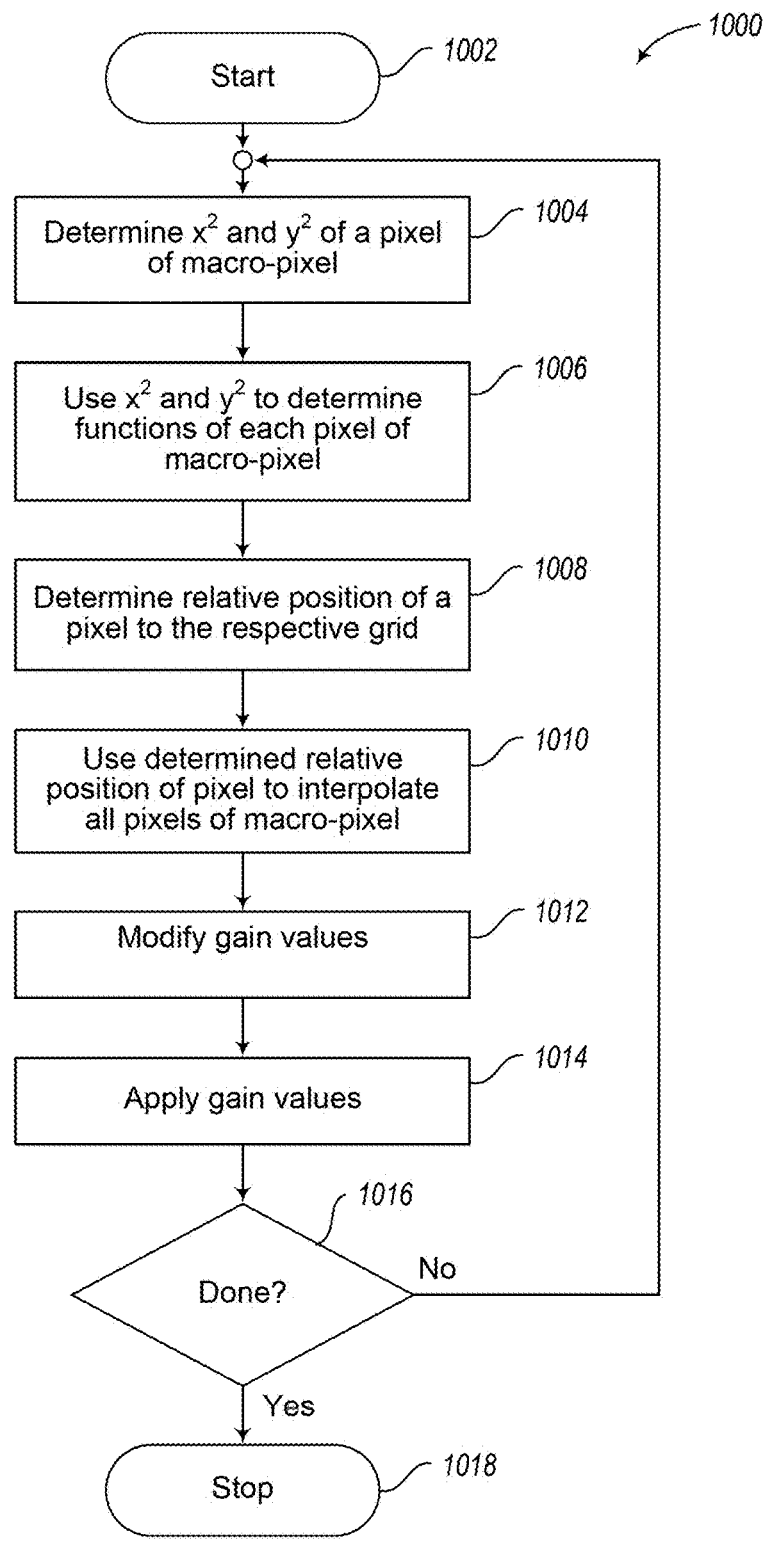
FIG. 10 illustrates an embodiment of a method of applying grid-based color shading correction during macro-pixel processing.

FIG. 10 illustrates an embodiment of a method 1000 of applying grid-based color shading correction during processing of a macro-pixel which takes advantage of the realization that $x^2$ and $y^2$ may be reused in macro-pixel processing and that the relative distance between pixels of a macro-pixel and the respective grids is the same for each pixel of a macro-pixel in some embodiments. An embodiment of the method 1000 may be employed, for example, by the lens shading circuit 722 of FIG. 7. For convenience, the method 1000 will be described with reference to the lens shading circuit 722 of FIG. 7.

The method 1000 starts at 1002 and proceeds to 1004. At 1004, the lens shading circuitry 722 determines $x^2$ and $y^2$ for a single pixel of the macro-pixel. The method 1000 proceeds to 1006. At 1006, the values of $x^2$ and $y^2$ determined at 1004 for the single pixel of the macro-pixel are used to determine the function f(x,y) of each pixel of the macro-pixel, for example as discussed above.

The method 1000 proceeds to 1008. At 1008 the lens shading circuitry 722 determines a relative position of a pixel with respect to the corresponding grid (e.g., with respect to the Green in red grid for a Green in red pixel). The method 1000 proceeds to 1010. At 1010, the lens shading circuitry 722 uses the relative position of the pixel with respect to the corresponding grid determined at 1008 to interpolate a gain value for each pixel of the macro-pixel. The method 1000 proceeds to 1012. At 1012, the lens shading circuitry 722 modifies the interpolated gain value for each pixel based on the respective determined function f(x,y). The method 1000 proceeds to 1014. At 1014, the lens shading circuitry 722 applies the modified gain values to the respective pixels of the macro-pixel. The method 1000 proceeds to 1016. At 1016, the lens shading circuitry 722 determines whether there are additional macro-pixels to process. When it is determined that there are additional macro-pixels to process, the method 1000 returns to 1004 to process the next macro-pixel. When it is not determined that there are additional macro-pixels to process, the method 1000 proceeds to 1018, where the method 1000 stops.

It is estimated that re-using interim function results in macro-pixel based processing to perform grid-based color shading such as in an embodiment of FIG. 10 may use 45% more area and 66% less power consumption than using raster processing. Compared to macro-pixel processing in an embodiment of FIG. 9, an embodiment of FIG. 10 re-using interim function results may use 50% less area and 63% less power consumption. Functions other than the example function f(x,y) discussed may be used by the vignetting and lens shading correction circuitry 722, which may similarly facilitate reuse of variable to facilitate reductions in power consumption.

With reference to Bayer processing circuit 700 of FIG. 7, an output of the lens shading circuit 722 is coupled to a hub 724. The hub 724 provides an output to a white balance circuit 726, which determines and applies a white balance gain, and may do so in a conventional manner. An output of the white balance circuit 726 is coupled to a tone mapping circuit 728. Tone mapping applies a gain to each pixel based on the pixel's luminance to when the dynamic range of the pixels is reduced (e.g., from 26 bits to 16 bits or 12 bits). Conventional raster-based tone mapping may be employed in an embodiment. An embodiment of a tone mapping circuit using macro-pixel based processing which may be employed in the embodiment of FIG. 7 is discussed in more detail below with reference to FIG. 11.

An output of the tone mapping circuit 728 is coupled to hub 730, which provides tone-mapped macro-pixels to a chrominance noise reduction circuit 732. As illustrated, the hub 730 also provides tone-mapped macro-pixels to a YUV circuit, such as YUV circuit 204 of FIG. 6. In an embodiment, the hub 730 provides tone-mapped macro-pixels to a demozaic circuit, such as the demozaic circuit 203 of FIG. 6. Conventional raster-based chrominance noise reduction may be employed in an embodiment, for example by employing parallel processing of individual pixels and data buffers. An embodiment of a chrominance noise reduction circuit using macro-pixel based processing which may be employed in the embodiment of FIG. 7 is discussed in more detail below with reference to FIG. 12. The chrominance noise reduction circuit 732 provides another output of the Bayer circuit 700, for example to a YUV circuit such as the YUV circuit 204 of FIG. 6, or to a demozaic circuit, such as the demozaic circuit 203 of FIG. 6.

Embodiments of the Bayer circuit 700 of FIG. 7 may employ contain more or fewer circuits, combine circuits into larger circuits, divide circuits into smaller circuits, etc., and various combinations thereof. For example, more or fewer hubs may be employed.

Figure 11:
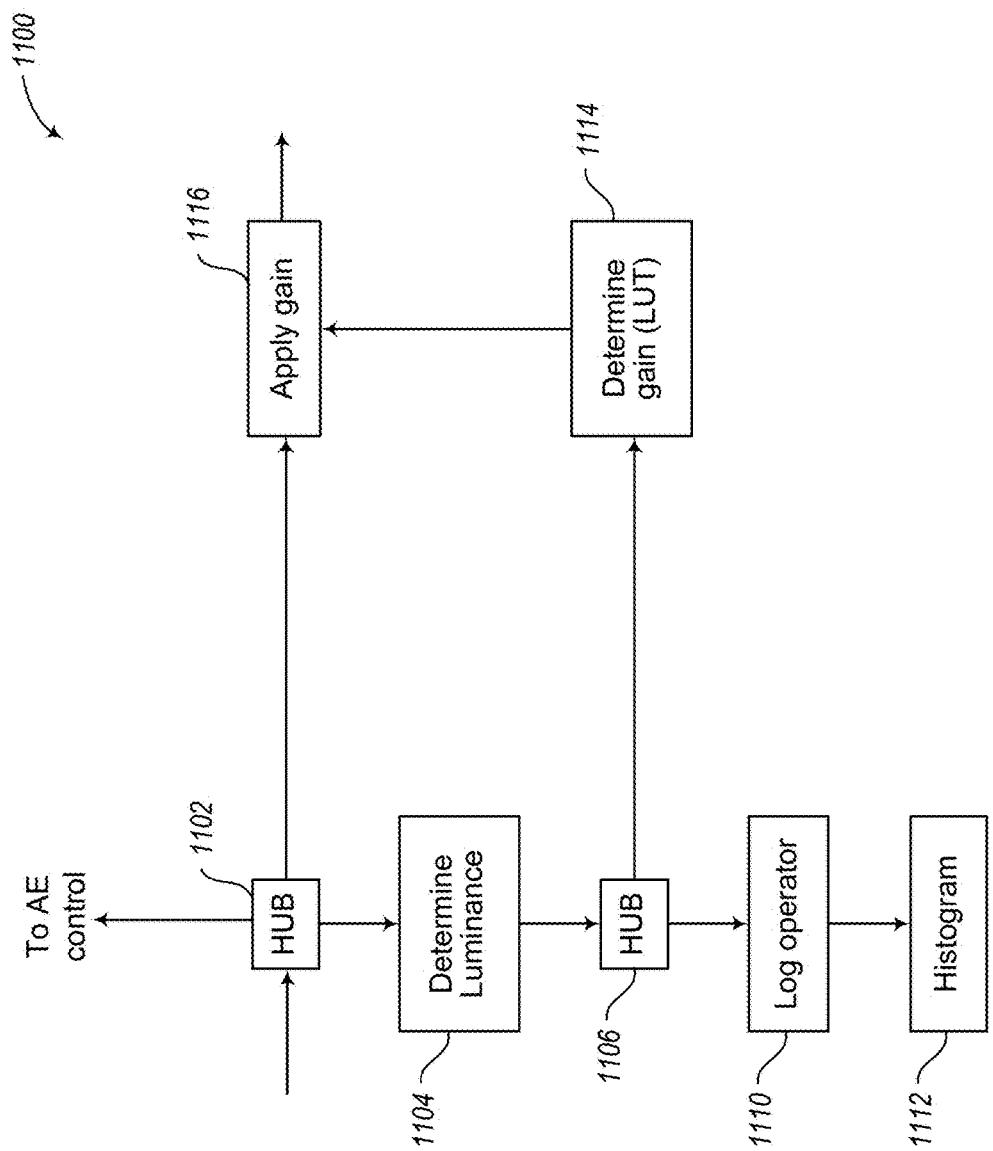
FIG. 11 is a functional block diagram of an embodiment of a tone mapping circuit employing macro-pixel processing.

FIG. 11 is a functional block diagram of an embodiment of a tone mapping circuit 1100 employing macro-pixel based processing. The tone mapping circuit 1100 may be employed, for example, in the system 100 of FIG. 6, in the Bayer circuit 700 of FIG. 7, etc. Tone mapping applies a gain to each pixel based on a pixel luminance to facilitate reducing the number of bits used to represent pixels (the dynamic range). As illustrated, the tone mapping circuit 1100 comprises hubs 1102, 1106, a luminance determining circuit 1104, a log operator circuit 1110, a histogram circuit 1112, a gain determining circuit 1114 and a gain applying circuit 1116.

The tone mapping circuit receives a macro-pixel for processing at hub 1102. The luminance determining circuit 1104 receives macro-pixels from the hub 1102, and determines one or more luminance values based on each received macro-pixel. The hub 1106 receives determined luminance values from the luminance determining circuit 1104 and provides luminance values to the log operator circuit 1110 and the gain determining circuit 1114. The log operator circuit 1110 and the histogram circuit 1112 may, for example, operate in a conventional manner to generate histogram information based on the received luminance information. The gain determining circuit 1114 receives the luminance information from the hub 1106 and determines pixel gains to be applied. The gain determining circuit 1114 may maintain a look-up-table based on histogram information generated by the histogram circuit 1112, and may use the look-up-table to determine pixel gains to be applied. The gain applying circuit 1116 receives macro-pixels from the hub 1102 and gains to be applied from the gain determining circuit 1114, and applies the determined pixel gains, for example, by multiplying pixel values by the gains to be applied.

In an embodiment, the tone mapping circuit 1100 may process macro-pixels in an RGB domain and determine gains for the individual color components of the macro-pixel. The luminance determining circuit 1104 individually determines a luminance value for each color component of a macro-pixel (four determinations), the gain determining circuit 1114 determines a gain value for each pixel macro-pixel (four determination), and the gain applying circuit 1116 applies the determined gain values for each color component (four multiplications) of the macro-pixel. The histogram may typically be computed on one eighth or one fourth of the individual pixels. Additional buffers may be employed in the gain determining circuit 1114 to facilitate determining the gains of the individual pixels.

In an embodiment, the tone mapping circuit 1100 may process macro-pixels in a Bayer domain and determine a single gain to be applied to the pixels of the macro-pixel. The luminance determining circuit 1104 determines a single luminance value for the macro-pixel (which may be done, for example, by using weighted values of the individual pixels). The gain determining circuit 1114 determines a single gain value for the macro-pixel (for example, by using a look-up-table), and the gain applying circuit 1116 applies the single determined gain value to the macro-pixel. The histogram may typically be computed on one half of the macro-pixels. It is estimated that Bayer macro-pixel processing according to an embodiment of the tone mapping circuit 1100 may employ 68% less area than RGB macro-pixel processing and 67% less power than RGB macro-pixel processing. As compared to raster processing of individual RGB pixels, it is estimated that Bayer macro-pixel processing according to an embodiment of the tone mapping circuit 1100 may employ 9.5% more area than raster-based RGB pixel processing while using 73% less power than raster-based pixel processing.

Figure 12:
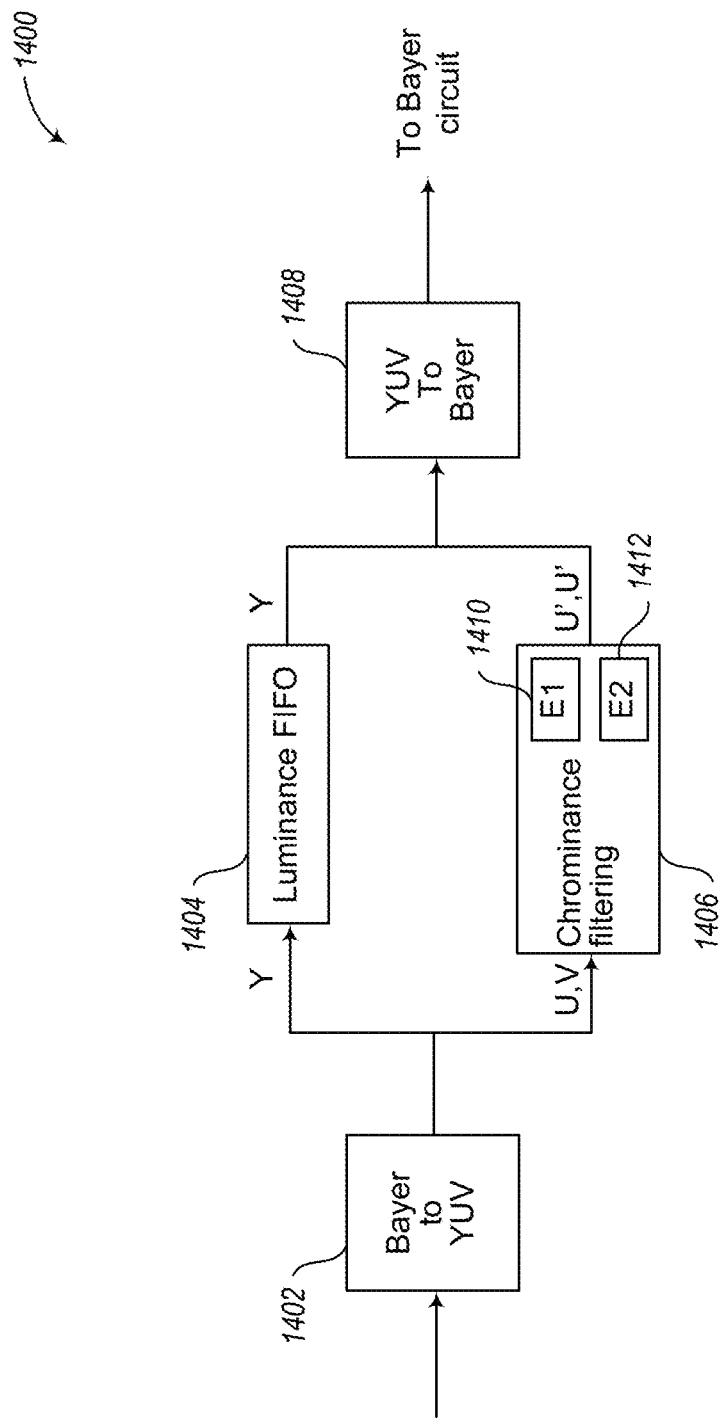
FIG. 12 is a functional block diagram of an embodiment of a chrominance noise reduction circuit employing macro-pixel processing.

FIG. 12 is a functional block diagram of an embodiment of a chrominance noise reduction circuit 1400 employing macro-pixel processing. The noise reduction circuit 1400 may be employed, for example, in the system 100 of FIG. 6, in the circuit 700 of FIG. 7, etc. The circuit 1400 comprises a Bayer to YUV conversion circuit 1402, which may, for example, convert a Bayer representation to a YUV representation, one or more luminance first-in first-out (FIFO) buffer(s) 1404, a chrominance filtering circuit 1406, which may, for example, apply chrominance noise filtering algorithms to the chrominance values, and a YUV to Bayer conversion circuit 1408, which may, for example, convert a YUV representation to a Bayer representation.

In operation of an embodiment, the chrominance noise reduction circuit 1400 receives a macro-pixel, for example from a tone mapping circuit such as the tone mapping circuit 1100 of FIG. 11, at the Bayer to YUV conversion circuit 1402. The chrominance noise reduction circuit 1400 may operate using pixels having a reduced dynamic range as a result of the tone mapping (e.g., 16 bit or 12 bit pixel data instead of 26 bit pixel data). In an embodiment, the Bayer to YUV circuit 1402 converts a Bayer representation of a macro-pixel to a modified YUV representation of the macro-pixel. The modified YUV macro-pixel has two chrominance values, a U chrominance value and a V chrominance value, and two luminance values, a luminance value associated with the U chrominance component of the macro-pixel and a luminance value associated with the V chrominance component of the macro-pixel. The Bayer to YUV circuit 1402 may determine a luminance value for the macro-pixel associated with the U chrominance component based on the U chrominance component of the macro-pixel and may determine the luminance component associated with the V chrominance component based on the V chrominance component of the macro-pixel.

In a conventional raster implementation of Bayer to YUV conversion, a memory is needed to store pixel values until the individual pixel values are received, and one computation occurs every four clock cycles in average. On even lines in raster processing, only the top half of a macro pixel is available and must be stored; on odd lines, the lower half of the macro pixel is received and the macro-pixel can be processed. In contrast, in a macro-pixel implementation of Bayer to YUV conversion or a Bayer to modified YUV conversion, the pixels of a macro-pixel may be received concurrently and a computation may occur every clock cycle. Luminance value(s) of the Bayer to YUV conversion circuit 1402 are provided to the FIFO buffer(s) 1404 and corresponding chrominance values U, V are provided to the chrominance noise filtering circuit 1406.

In a conventional raster implementation of chrominance filtering, two filtered components U', V' are generated every two clock cycles on odd lines, for example, serially using a single computation engine to determine one filtered component (e.g., U') in one clock cycle and the other filtered component (e.g., V') in the next clock cycle. As illustrated, the chrominance filtering circuit 1406 includes a first computation engine E1 1410 and a second computation engine E2 1412. In a macro-pixel implementation of an embodiment, the two computation engines 1410, 1412 may be employed in parallel to determine two filtered components (e.g., U' and V') in a single clock cycle because all the data needed to perform the computations is available during the first clock cycle.

In operation of an embodiment, in each clock cycle the YUV to Bayer conversion circuit 1408 receives one or more Y component value(s) from the FIFO buffer(s) 1404 and corresponding filtered chrominance component values U', V' from the chrominance filtering circuit 1406. The YUV to Bayer circuit 1408 converts a YUV representation of a macro-pixel to a Bayer representation of the macro-pixel. In a conventional raster implementation of YUV to Bayer conversion, one computation occurs every four clock cycles in average and a memory is needed to store pixel values as individual pixel values are transmitted one per clock cycle. In contrast, in a macro-pixel implementation of YUV to Bayer conversion, a computation may occur every clock cycle and the pixels of a macro-pixel may be concurrently transmitted. A filtered macro-pixel is output by the YUV to Bayer circuit 1408, as illustrated to a CFA processing circuit, such as the CFA processing circuit 202 of FIG. 6.

Figure 13:
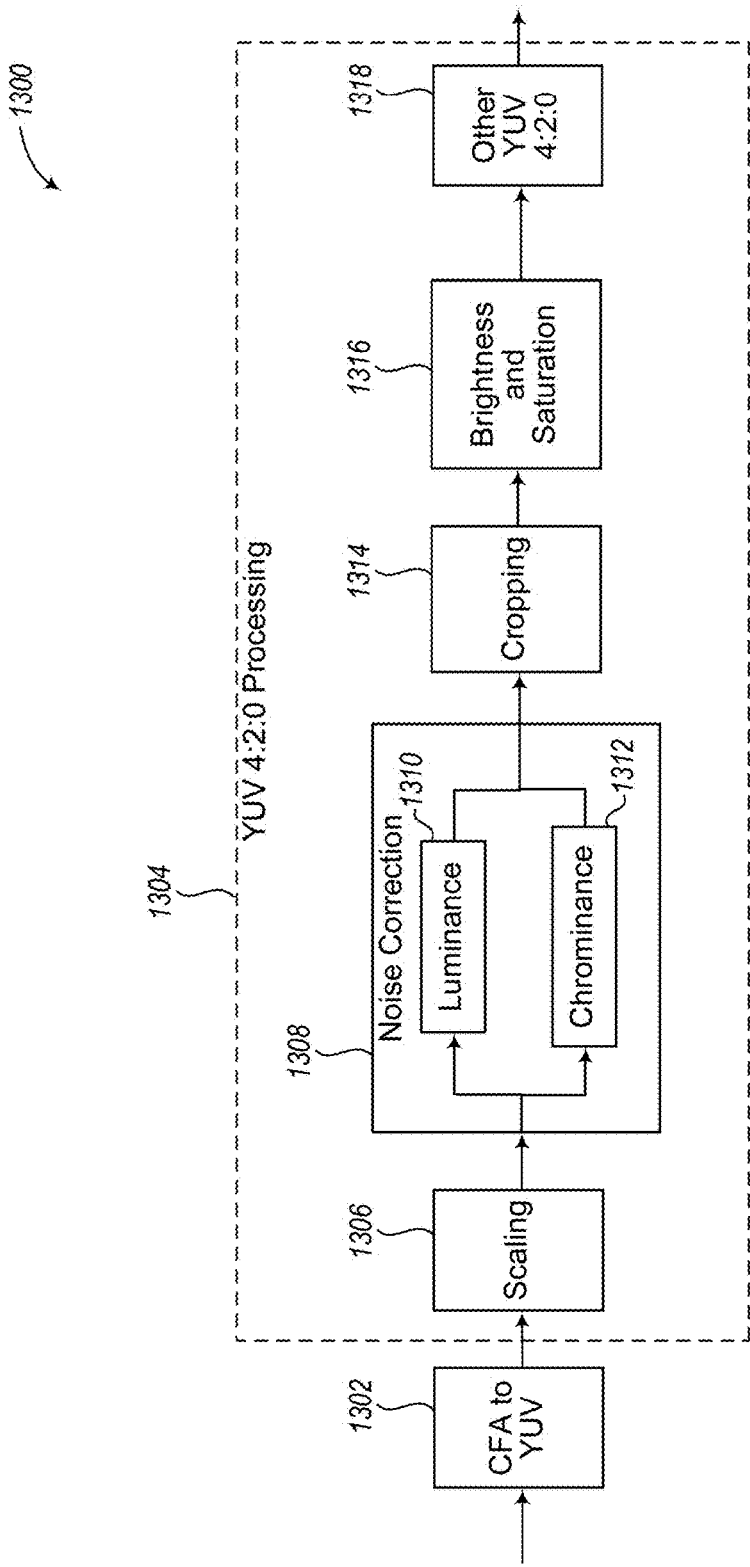
FIG. 13 is a functional block diagram of an embodiment of a YUV macro-pixel processing circuit.

FIG. 13 is a functional block diagram of a YUV macro-block processing circuit 1300 according to an embodiment. The YUV processing circuit 1300 may be employed, for example, in the system 100 of FIG. 6. As illustrated, a conversion circuit 1302 converts a CFA representation of a macro-pixel, such as a Bayer representation of a macro-pixel, to a YUV 4:2:0 representation. As mentioned above, because macro-pixel processing is employed, one macro-pixel, on average, may be converted in each clock cycle because all the data for a macro-pixel is available for processing at each clock cycle. Some embodiments may employ pipeline processing. For example, the conversion circuit 1302 may typically convert a Bayer representation of macro-pixel to a RGB representation, and then convert the RGB representation to a YUV 4:2:0 representation.

In conventional raster-based processing, a conversion circuit typically converts a Bayer representation into an RGB representation, and then converts the RGB representation into a YUV 4:4:4 representation for raster-based YUV processing. In raster-based processing, four clock cycles, on average, may be needed to convert a Bayer macro-pixel to a YUV 4:4:4 macro-pixel. Raster-based processing of pixels represented in a YUV 4:4:4 color space occurs until just before compression or transmission, when the pixels are converted from a YUV 4:4:4 color space to a YUV 4:2:0 color space.

In an embodiment, the conversion circuit 1302 may convert CFA macro-pixels, such as Bayer macro-pixels, to YUV 4:4:4 macro-pixels, and macro-pixel processing, as opposed to raster-based processing, may occur in YUV 4:4:4 format until just before compression or transmission, or just after transmission. When macro-pixel processing is applied to YUV 4:4:4 macro-pixels, there are 3 components per pixel, and twelve components per macro-pixel. The complexity of the circuit may be four times larger than a raster implementation using a YUV 4:4:4 representation of the pixels, but less power may be used than in a raster-based implementation.

In the illustrated embodiment, the conversion circuit 1302 converts Bayer macro-pixels to YUV 4:2:0 macro-pixels, and subsequent processing is macro-pixel based processing of YUV 4:2:0 macro-pixels. When macro-pixel processing is applied to YUV 4:2:0 macro-pixels, there are 6 components per macro-pixel. The complexity may be two times larger than a raster implementation using a YUV 4:4:4 representation of the pixels, and less power may be used than in a raster-based implementation. As compared to a macro-pixel processing applied to YUV 4:4:4 macro-pixels, the area and power usages may be reduced by a factor of 2.

The conversion circuit 1302 provides an output to a YUV 4:2:0 processing block or circuitry 1304. As illustrated, the YUV 4:2:0 processing block comprises a down scaler 1306, a noise reduction circuit 1308, a cropping circuit 1314, a brightness and saturation control circuit 1316, and one or more other YUV 4:2:0 processing blocks or circuits 1318 (e.g., temporal noise reduction, matrixing operations, sharpening operations, post decoding deblocking, etc.). As illustrated, the noise reduction circuit 1308 includes a luminance noise correction block or circuit 1310 and a chrominance noise correction block or circuit 1312, which may, for example, apply various noise filtering algorithms to luminance and chrominance values.

Embodiments of the YUV 4:2:0 circuit 1300 of FIG. 13 may employ contain more or fewer circuits, combine circuits into larger circuits, divide circuits into smaller circuits, re-arrange the order of circuits, etc., and various combinations thereof. For example, one or more hubs may be employed. As noted above in the description of FIG. 6, the YUV processing circuitry 1304 may include a bus system configured to transport macro-pixels in a YUV 4:2:0 color space between the processing blocks of the YUV processing circuitry 1304 (e.g., between blocks 1302-1318).

Table 1, below, indicates the estimated area and power usage of various macro-pixel processing embodiments as compared to each other and to conventional raster-based processing. The row of Table 1 labeled Bayer/YUV compares macro-pixel based processing as applied to Bayer processing and to YUV processing (e.g., with reference to FIG. 6, Bayer circuit 202 and YUV circuit 204 apply macro-pixel based processing). The row of Table 1 labeled YUV only compares macro-pixel based processing as applied to YUV processing (e.g., with reference to FIG. 6, YUV circuit 204 applies macro-pixel based processing). The row of Table 1 labeled YUV without Noise Reduction compares macro-pixel based processing as applied to YUV processing which does not include noise reduction processing (e.g., with reference to FIG. 13, YUV circuit 1300 omits circuit 1308).

TABLE 1

| Macro-Pixel Implementation | | Conventional Raster (4 × freq.) | 4:4:4 Macro Pixel | 4:2:0 Macro Pixel | 4:4:4 compared to 4:2:0 (% savings with 4:2:0) |
|---|---|---|---|---|---|
| Bayer/YUV | Area | 6.35 mm² | 9.48 mm² | 8.8 mm² | .68 mm² or 7.2% |
|  | Power | 267 mW | 117 mW | 107 mW | 10 mW or 8.5% |
| YUV only | Area | 1.26 mm² | 3.20 mm² | 2.52 mm² | .68 mm² or 21% |
|  | Power | 63 mW | 46 mW | 36 mW | 10 mW or 22% |
| YUV w/o Noise Reduction | Area | .64 mm² | 1.61 mm² | .93 mm² | .68 mm² or 42% |
|  | Power | 31 mW | 23 mW | 13 mW | 10 mW or 43% |

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    maintaining, using digital image processing circuitry, a look-up table;
    determining, using the digital image processing circuitry, a luminance value of a macro-pixel of a digital image in a color space, the macro-pixel including a plurality of individual pixels;
    determining, using the digital image processing circuitry, respective gain values of each pixel of the macro-pixel based on the determined luminance value of the macro-pixel and the look-up table; and
    applying, using the digital image processing circuitry, the determined gain values to the respective pixels of the macro-pixel.

2. The method of claim 1 comprising:
    maintaining, using the digital image processing circuitry, luminance based histogram information; and
    maintaining, using the digital image processing circuitry, the look-up table based on the luminance based histogram information.

3. The method of claim 2, comprising:
    processing a plurality of macro-pixels of the digital image, wherein the maintaining the luminance based histogram information comprises generating a histogram based on half of the macro-pixels of the plurality of macro-pixels.

4. The method of claim 1 wherein the determining the respective gain values of the pixels of the macro-pixel based on the luminance value of the macro-pixel and the look-up table comprises performing a single look-up operation in the look-up table.

5. The method of claim 1 wherein each pixel of the macro-pixel has a single respective gain value.

6. The method of claim 1 wherein the color space is a Bayer color space.

7. A device, comprising:
    luminance determination circuitry, which, in operation, determines a luminance value of a macro-pixel of a digital image in a color space, the macro-pixel including a plurality of individual pixels;
    gain determination circuitry, which in operation, determines respective gain values of each pixel of the macro-pixel based on the determined luminance value of the macro-pixel; and
    gain application circuitry, which, in operation, applies the determined gain values to the respective pixels of the macro-pixel, wherein the gain determining circuitry comprises a look-up table and, in operation, the gain determining circuitry determines the respective gain values of the pixels of the macro-pixel based on the luminance value of the macro-pixel and the look-up table.

8. The device of claim 7 wherein the determining the respective gain values of the pixels of the macro-pixel based on the luminance value of the macro-pixel and the look-up table comprises performing a single look-up operation in the look-up table.

9. The device of claim 7 wherein each pixel of the macro-pixel has a single respective gain value.

10. The device of claim 7 wherein the color space is a color filter array (CFA) color space.

11. The device of claim 10 wherein the CFA color space is a Bayer color space.

12. A device, comprising:
luminance determination circuitry, which, in operation, determines a luminance value of a macro-pixel of a digital image in a color space, the macro-pixel including a plurality of individual pixels;
histogram generation circuitry, which, in operation, generates a histogram based on macro-pixel luminance historical information;
gain determination circuitry, which in operation, determines respective gain values of each pixel of the macro-pixel based on the determined luminance value of the macro-pixel; and
gain application circuitry, which, in operation, applies the determined gain values to the respective pixels of the macro-pixel, wherein the gain determination circuitry, in operation, determines respective gain values of each pixel of the macro-pixel based on the determined luminance value of the macro-pixel and the histogram.

13. The device of claim 12 wherein the gain determining circuitry comprises a look-up table and, in operation, the gain determining circuitry determines the respective gain values of the pixels of the macro-pixel based on the luminance value of the macro-pixel and the look-up table.

14. The device of claim 12 wherein the histogram generation circuitry, in operation, generates the histogram based on half of a plurality of macro-pixels of the digital image.

15. A system, comprising:
an image sensor, which, in operation, generates digital images in a color space; and
digital image tone mapping circuitry, which, in operation:
determines a luminance value of a macro-pixel of a digital image in the color space, the macro-pixel including a plurality of individual pixels;
determines respective gain values of each pixel of the macro-pixel based on the determined luminance value of the macro-pixel; and
applies the determined gain values to the respective pixels of the macro-pixel, wherein the digital image tone mapping circuitry comprises a look-up table and, in operation, the digital image tone mapping circuitry determines the respective gain values of the pixels of the macro-pixel based on the luminance value of the macro-pixel and the look-up table.

16. The system of claim 15 wherein the digital image tone mapping circuitry comprises a plurality of multipliers, which, in operation, multiple respective pixels of the macro-pixel by the respective gain values.

17. The system of claim 15 wherein the color space is a Bayer color space.

18. A system, comprising:
an image sensor, which, in operation, generates digital images in a color space; and
digital image tone mapping circuitry, which, in operation:
determines a luminance value of a macro-pixel of a digital image in the color space, the macro-pixel including a plurality of individual pixels;
determines respective gain values of each pixel of the macro-pixel based on the determined luminance value of the macro-pixel; and
applies the determined gain values to the respective pixels of the macro-pixel, wherein the digital image tone mapping circuitry, in operation, generates a histogram based on macro-pixel luminance historical information and determines respective gain values of each pixel of the macro-pixel based on the determined luminance value of the macro-pixel and the histogram.

19. The system of claim 18 wherein the histogram is based on half of a plurality of macro-pixels of the digital image.

20. The system of claim 18 wherein the digital image tone mapping circuitry comprises a look-up table and, in operation, the digital image tone mapping circuitry determines the respective gain values of the pixels of the macro-pixel based on the luminance value of the macro-pixel and the look-up table.

21. A non-transitory computer-readable medium having contents which configure a digital image processing circuit to perform a tone mapping method, the tone mapping method comprising:
determining a luminance value of a macro-pixel of a digital image in a color space, the macro-pixel including a plurality of individual pixels;
determining respective gain values of each pixel of the macro-pixel based on the determined luminance value of the macro-pixel; and
applying the determined gain values to the respective pixels of the macro-pixel, wherein the method comprises:
maintaining a look-up table; and
determining the respective gain values of the pixels of the macro-pixel based on the luminance value of the macro-pixel and the look-up table.

22. The non-transitory computer-readable medium of claim 21 wherein the color space is a color-filter-array (CFA) color space.

23. A non-transitory computer-readable medium having contents which configure a digital image processing circuit to perform a tone mapping method, the tone mapping method comprising:
determining a luminance value of a macro-pixel of a digital image in a color space, the macro-pixel including a plurality of individual pixels;
determining respective gain values of each pixel of the macro-pixel based on the determined luminance value of the macro-pixel; and
applying the determined gain values to the respective pixels of the macro-pixel, wherein the method comprises:
maintaining historical luminance information; and
maintaining the look-up table based on the historical luminance information.

24. The non-transitory computer-readable medium of claim 23 wherein the method comprises:
maintaining a look-up table; and
determining the respective gain values of the pixels of the macro-pixel based on the luminance value of the macro-pixel and the look-up table.

* * * * *